(12) United States Patent
Schwartz (10) Patent No.: US 10,839,396 B2
(45) Date of Patent: Nov. 17, 2020

(54) ADAPTIVE GENERATION OF SURCHARGES AND OTHER TRANSACTION COSTS

(71) Applicant: Global Payments Gaming Services Inc., Las Vegas, NV (US)

(72) Inventor: Andrew J. Schwartz, Las Vegas, NV (US)

(73) Assignee: Global Payments Gaming Services, Inc., Las Vegas, NV (US)

( * ) Notice: Subject to any disclaimer, the term of this patent is extended or adjusted under 35 U.S.C. 154(b) by 15 days.

(21) Appl. No.: 16/000,942

(22) Filed: Jun. 6, 2018

(65) Prior Publication Data

US 2018/0349902 A1 Dec. 6, 2018

Related U.S. Application Data

(60) Provisional application No. 62/515,574, filed on Jun. 6, 2017.

(51) Int. Cl.
*G06Q 20/40* (2012.01)
*G06Q 20/10* (2012.01)
(Continued)

(52) U.S. Cl.
CPC ....... *G06Q 20/405* (2013.01); *G06Q 20/1085* (2013.01); *G06Q 20/18* (2013.01);
(Continued)

(58) Field of Classification Search
CPC .. G06Q 20/405; G06Q 20/1085; G06Q 20/18; G06Q 20/407; G06Q 20/00;
(Continued)

(56) References Cited

U.S. PATENT DOCUMENTS

| 5,988,498 A | * | 11/1999 | Hoell | ..... G06Q 30/06 235/383 |
| 7,970,713 B1 | * | 6/2011 | Gorelik | ..... G06Q 30/0206 705/400 |

(Continued)

*Primary Examiner* — Namrata Boveja
*Assistant Examiner* — Divesh Patel
(74) *Attorney, Agent, or Firm* — Mendelsohn Dunleavy, P.C.; Steve Mendelsohn (57) ABSTRACT

In one embodiment, a cash machine, such as a casino kiosk or a bank ATM, charges a varying surcharge to patrons requesting cash withdrawals, where the size of the surcharge depends on previous requests for cash-withdrawal transactions. In general, whether or not a previous patron agreed to complete a previously requested cash withdrawal having a specified surcharge may affect the size of the surcharge offered to the next patron requesting a cash withdrawal. For example, if the previous patron completed the previous transaction, then the cash machine might increase the surcharge offered to the next patron and, if the previous patron failed to complete the previous transaction, then the cash machine might decrease the surcharge offered to the next patron. The invention can be applied to types of transactions other than cash withdrawals from cash machines, where customer touchpoints adjust current prices based on the history of previous transactions.

28 Claims, 3 Drawing Sheets

(51) Int. Cl.
*G06Q 20/18* (2012.01)
*G07F 17/32* (2006.01)
*G07F 19/00* (2006.01)

(52) U.S. Cl.
CPC ....... *G06Q 20/407* (2013.01); *G07F 17/3244* (2013.01); *G07F 19/203* (2013.01)

(58) Field of Classification Search
CPC .............. G06Q 30/02; G06Q 30/0201; G06Q 30/0202; G06Q 30/0206; G06Q 30/0207; G06Q 30/0211; G06Q 30/0219; G06Q 30/0224; G06Q 30/0237; G06Q 30/0283; G07F 17/32; G07F 17/3202; G07F 17/3204; G07F 17/3209; G07F 17/3211; G07F 17/3213; G07F 17/3216; G07F 17/3218; G07F 17/322; G07F 17/3223; G07F 17/3225; G07F 17/3227; G07F 17/323; G07F 17/3232; G07F 17/3234; G07F 17/3237; G07F 17/3239; G07F 17/3241; G07F 17/3244; G07F 17/3246; G07F 17/3248; G07F 17/3251; G07F 17/3253; G07F 17/3255; G07F 17/3258; G07F 17/326; G07F 17/3262; G07F 17/3265; G07F 17/3267; G07F 17/3269; G07F 17/3272; G07F 17/3274; G07F 17/3276; G07F 17/3279; G07F 17/3281; G07F 17/3283; G07F 17/3286; G07F 17/3288; G07F 17/329; G07F 17/3293; G07F 17/3295; G07F 17/3297; G07F 19/203; G07F 19/20; G07F 19/201; G07F 19/202; G07F 19/204; G07F 19/205; G07F 19/2055; G07F 19/206; G07F 19/207; G07F 19/208; G07F 19/209; G07F 19/211
See application file for complete search history.

(56) References Cited

U.S. PATENT DOCUMENTS

| | | | | |
|---|---|---|---|---|
| 2002/0052845 A1* | 5/2002 | Nielsen | ............ | G06Q 20/1085 705/43 |
| 2002/0062254 A1* | 5/2002 | Matsko | ............ | G06Q 30/0236 705/20 |
| 2003/0074316 A1* | 4/2003 | McCallum | ............ | G06Q 30/04 705/43 |
| 2004/0016796 A1* | 1/2004 | Hanna | ................ | G07D 11/0096 235/375 |
| 2005/0149458 A1* | 7/2005 | Eglen | ..................... | G06Q 30/06 705/400 |
| 2008/0114681 A1* | 5/2008 | Staddon | ................ | G06Q 30/06 705/50 |
| 2009/0240628 A1* | 9/2009 | Blair | ..................... | G06Q 30/08 705/80 |
| 2010/0057661 A1* | 3/2010 | Otto | ................... | G06Q 30/0224 706/47 |
| 2010/0222132 A1* | 9/2010 | Sanford | ................ | G06Q 30/02 463/25 |
| 2011/0231314 A1* | 9/2011 | Sears | ..................... | G06Q 20/18 705/43 |
| 2013/0030871 A1* | 1/2013 | Schwitzky | ............. | G06Q 30/02 705/7.35 |
| 2013/0332268 A1* | 12/2013 | Foster | ................ | G06Q 30/0248 705/14.47 |
| 2014/0278973 A1* | 9/2014 | Lowe | ................ | G06Q 30/0255 705/14.53 |

* cited by examiner

ADAPTIVE GENERATION OF SURCHARGES AND OTHER TRANSACTION COSTS

CROSS-REFERENCE TO RELATED APPLICATIONS

This application claims the benefit of the filing date of U.S. provisional application No. 62/515,574, filed on Jun. 6, 2017, the teachings of which are incorporated herein by reference in their entirety.

BACKGROUND

Field of the Invention

The present invention relates to systems for setting prices such as (without limitation) the surcharge applied to a cash-withdrawal transaction conducted by a patron (aka customer) at a customer touchpoint, such as a casino kiosk or bank automated teller machine (ATM).

Description of the Related Art

This section introduces aspects that may help facilitate a better understanding of the invention. Accordingly, the statements of this section are to be read in this light and are not to be understood as admissions about what is prior art or what is not prior art.

Conventional cash machines, such as casino kiosks and bank ATMs, are capable of dispensing paper currency (aka bills) to patrons who request cash withdrawals. Some institutions that provide such cash machines charge a fixed surcharge for each cash-withdrawal transaction. For example, a bank may charge patrons a fixed surcharge of $2 for each transaction independent of the monetary value of the cash withdrawal. If a patron requests a cash withdrawal of $20 from his checking account, then the bank applies the $2 surcharge and debits $22 from the patron's checking account. If the patron requests a cash withdrawal of $200 from his checking account, then the bank applies the $2 surcharge and debits $202 from the patron's checking account.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "customer touchpoint" refers to any device employed by a customer to engage with a business with regard to a possible transaction. For example, in the context of a cash-withdrawal transaction, the customer touchpoint may be a cash machine like a bank ATM machine or a casino kiosk. In general, a customer touchpoint may be any point-of-sale device, such as (without limitation) a register at a store, a gas pump, a parking meter, a vending machine, or a consumer device used for remote business transactions such as a cell phone, a tablet, or a laptop or desktop computer. The following discussion is couched in terms of cash-withdrawal transactions performed by customers at cash machines, but the invention is not necessarily limited to cash machines or to cash-withdrawal transactions.

According to certain embodiments of the present invention, the surcharge applied by a cash machine for a cash-withdrawal transaction changes over time based on one or more different factors. According to one embodiment, when a current patron requests a cash withdrawal, the cash machine informs the current patron of the current size of the surcharge for that transaction and then gives the current patron the option of accepting or refusing to complete the transaction with that identified surcharge. If the current patron accepts the transaction, then the surcharge is increased for the next cash-withdrawal request by the next patron at that same cash machine, and, if the current patron refuses the transaction, then the surcharge is decreased for the next cash-withdrawal request by the next patron. The system that includes the cash machine, adaptively generates surcharges for cash-withdrawal transactions as a function of the past history of those transactions such that the size of the surcharge changes over time.

There are many other variables and/or factors that can be taken into account by such a system in adaptively generating the cash-withdrawal transaction surcharges, including one or more of the following:

The size of the increase in the surcharge may be the same as or different from the size of the decrease in the surcharge. In some implementations, surcharge increases are larger than surcharge decreases. Some implementations may involve only surcharge increases or only surcharge decreases.

The sizes of the surcharge increases and/or decreases can be based on specified increments (e.g., specified numbers of cents) or they can be based on the size of the current surcharge (e.g., specified percentages of the current surcharge).

The sizes of the increases and/or decreases in the surcharge may vary over time.

The system can take into account the duration of time that it takes a current patron to accept or refuse a transaction after being informed of the current surcharge. For example, if the current patron quickly accepts the transaction (e.g., duration less than a specified time limit), then the increase in the surcharge for the next patron can be larger than the increase in the surcharge for the next patron if the current patron slowly accepts the transaction (e.g., duration greater than the specified time limit). Similarly, if the current patron quickly refuses the transaction, then the decrease in the surcharge for the next patron can be larger than the decrease in the surcharge for the next patron if the current patron slowly refuses the transaction.

If the current patron refuses the transaction, then the cash machine can propose a modified transaction. For example, if the current patron refuses the transaction with the current surcharge for the amount of cash requested by the patron, then the cash machine can offer to provide a larger amount of cash to the patron at the same current surcharge. If the current patron refuses the modified transaction, then the decrease in the surcharge for the next patron can be smaller than the decrease would have been had the current patron not been offered the modified transaction.

The system can take into account whether the next cash-withdrawal request is made by the same patron or a different patron. If the current transaction is refused by the same patron who then requests the next transaction (whether or not the request is for the same or different account (e.g., bank checking account)), then the surcharge can remain the same (or even increase) to avoid a patron trying to secure a smaller surcharge by purposely refusing one or more transactions in a row. The cash machine can employ sensor technology to detect whether or not the current patron is the same person as the previous patron. For example, the video generated by the cash machine camera can be analyzed to detect changes in imagery that correspond to a current patron leaving and the next patron arriving at the cash machine. Alternatively or in addition, infrared and/or ultrasonic sensor technology can be employed to detect patron presence or absence over time to determine whether the current patron is the same as the previous patron.

The system can take into account whether the next cash-withdrawal request is made for the same or different account (e.g., bank checking account). If the current transaction is refused for a particular account and then the next request is for that same account (whether or not the patron is the same or different), then the surcharge can remain the same (or even increase) to avoid patrons securing a smaller surcharge by purposely refusing one or more transactions in a row for the same account.

The system can take time into account in determining when to apply surcharge increases and/or decreases. That is, surcharge increases and/or decreases can be applied at fixed or adaptively determined time intervals rather than between each successive pair of transaction requests. For example, to avoid upsetting the next patron who sees the surcharge increase from the surcharge that was offered to the previous patron, surcharge increases and/or decreases can be applied after a specified duration has passed from the previous surcharge adjustment or after a specified number of transactions have been attempted. Alternatively or in addition, surcharge increases and/or decreases can be applied after a specified duration has passed from the previous accepted or refused transaction. When multiple transaction requests have been made since the previous surcharge adjustment, the processing can take into account the numbers and/or sequence of acceptances and refusals resulting from those requests in determining what adjustment to make to the previous surcharge. In some implementations, the adjustment may be equal to the net adjustment that would result from incrementing the surcharge after each acceptance and decrementing the surcharge after each refusal. In other implementations, more-sophisticated processing may be applied to generate the surcharge adjustment, possibly taking into account the sequence of acceptances and refusals.

The system can take into account different times of day, different days of the week, and/or for different times of the year in adaptively generating surcharges. For example, surcharge increases can be larger (or smaller) and/or surcharge decreases can be smaller (or larger) during evening hours than they are during daylight hours. Similarly, surcharge increases can be larger (or smaller) and/or surcharge decreases can be smaller (or larger) during weekends than they are during weekdays. Likewise, surcharge increases can be larger (or smaller) and/or surcharge decreases can be smaller (or larger) during holidays than they are during non-holidays. Moreover, the system can implement independent processing for each of these different periods of time. For example, if the processing is different for weekdays than for weekends, then the system can perform two different sets of processing: one set for Monday through Friday and another set for Saturday and Sunday, where the weekday processing that ended on Friday can be resumed on the next Monday and the weekend processing that ended on Sunday can be resumed on the next Saturday.

The system can take into account the amount of cash requested when determining the size of the surcharge. For example, the surcharge can be larger (e.g., a larger fixed amount or a larger percentage) for smaller cash withdrawals to encourage patrons to withdraw larger amounts of money.

The system can keep track of sequences of requests for individual patrons. For example, if a particular patron frequently requests and accepts transactions (e.g., more than a specified number of transactions within a specified period of time), then the surcharge increases for that patron can be larger and/or the surcharge decreases for that patron can be smaller than the surcharge increases and/or decreases for other patrons who make and accept transactions less frequently.

The system can charge different surcharges to different types of patrons. For example, if the cash machine is provided by a casino, then the casino can charge a lower surcharge to its better patrons who come to the casino more frequently than other patrons.

The system can apply upper and/or lower limits on the size of the surcharge, and the sizes of the increases and/or decreases may change (e.g., get smaller) as the limits are approached.

In some embodiments, a single institution (e.g., a bank or casino) operates a system involving multiple cash machines. In some implementations, the processing that determines cash-withdrawal transaction surcharges can be implemented independently for each different cash machine in the system. In other implementations, the surcharge-determination processing can be implemented a single time for two or more—and possibly all—of the cash machines in the system. In that latter case, the acceptance or refusal of a cash-withdrawal transaction at one cash machine in the system can affect the surcharge applied to a subsequent cash-withdrawal transaction at another cash machine in the system.

Figure 1:
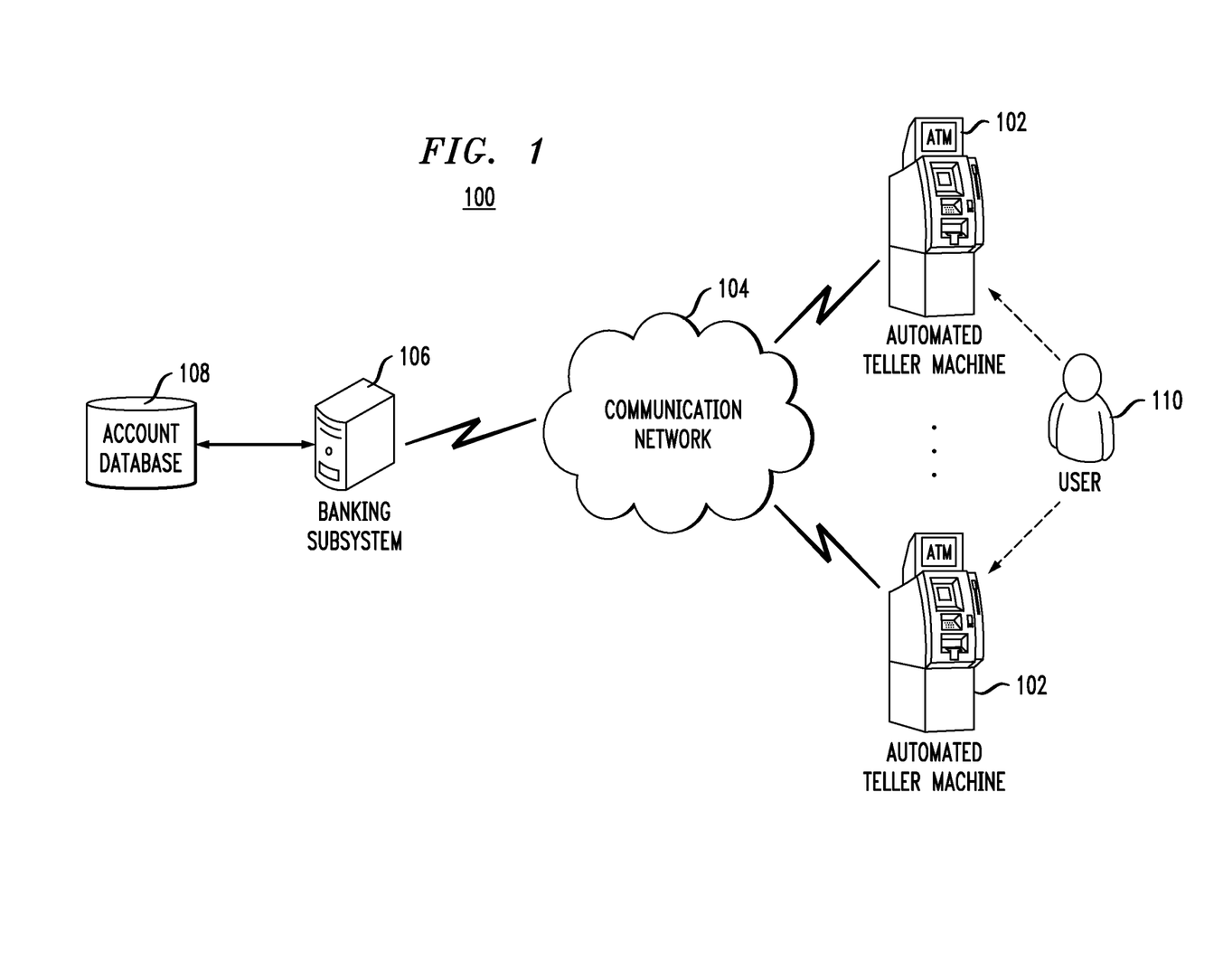
FIG. 1 is a simplified, high-level block diagram of an ATM system according to one possible embodiment of the invention.

FIG. 1 is a simplified, high-level block diagram of an ATM system 100 according to one possible embodiment of the invention. As shown in FIG. 1, the ATM system 100 has a plurality of ATM machines 102 that are configured to communicate via a suitable communication network 104 with a banking subsystem 106 that accesses a database 108 storing information about customer bank accounts. The ATM system 100 enables customers, like user 110, to operate the ATM machines 102 to access their bank accounts to perform banking functions, such as withdrawing cash.

The communication network 104 may include a local area network (LAN), a wide area network (WAN), and/or a global area network (GAN). The communication network 104 may provide for wireline, wireless, or a combination of wireline and wireless communication between devices in the network. In one embodiment, the communication network 104 includes the Internet.

Depending on the particular implementation, the processing for the present invention may be performed within each ATM machine 102 or within the banking subsystem 106 or distributed among those nodes of the ATM system 100.

Figure 2:
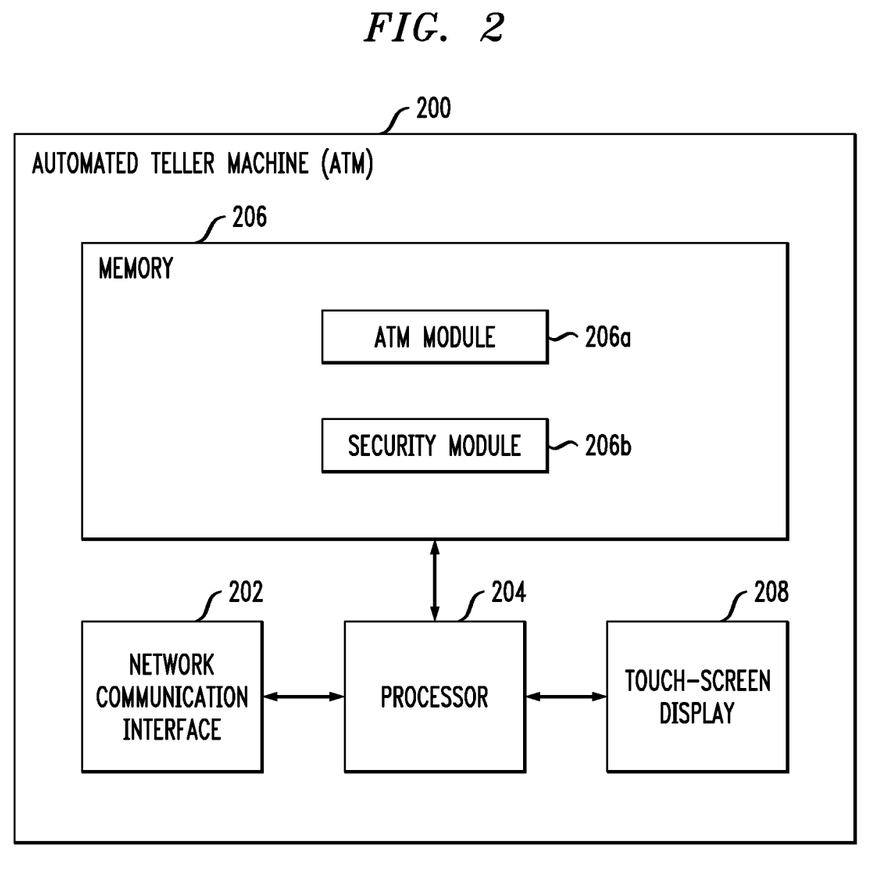
FIG. 2 is a simplified, high-level block diagram of an ATM machine that may be used to implement any of the ATM machines of FIG. 1 according to one embodiment of the invention.

FIG. 2 is a simplified, high-level block diagram of an ATM machine 200 that may be used to implement any of the ATM machines 102 of FIG. 1 according to one embodiment of the invention. As shown in FIG. 2, the ATM machine 200 includes a network communication interface 202, a processing device 204, a memory device 206, and a touch-screen display device 208. In certain embodiments, the ATM machine 200 is operated by a financial institution, such as a bank, while, in other embodiments, the ATM machine 200 is operated by an entity other than a financial institution.

The memory device 206 includes computer-executable code that instructs the processing device 204 to operate the network communication interface 202 to perform certain communication functions of the ATM machine 200. In one embodiment, the memory device 206 may include an ATM module 206a and a security module 206b. The computer-executable program code of the ATM module 206a and the security module 206b may instruct the processing device 204 to perform certain login, data-processing, and data-storage functions of the ATM machine 200, as well as communication functions of the ATM machine 200. In this regard, the processing device is typically configured to communicate with the banking subsystem 106 of FIG. 1 to validate a customer seeking to perform a financial transaction and render text on the display device 208. It should be appreciated that the display device 208 includes touch-screen functionality allowing a user to interact with the ATM machine 200.

Although not represented in FIG. 2, a typical ATM machine 200 will have other components designed and configured to support cash-withdrawal transactions, including components that receive, read, and validate ATM cards as well as components that store and dispense requested amounts of cash.

Figure 3:
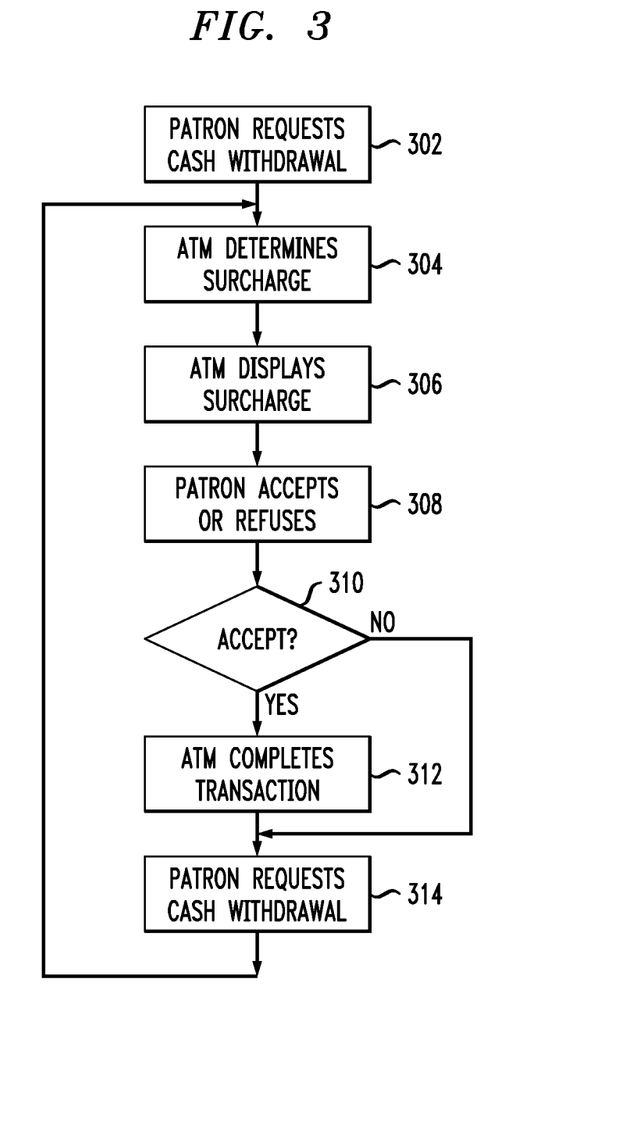
FIG. 3 is a flow diagram illustrating the operations of an ATM machine of FIG. 1 according to one example embodiment of the invention.

FIG. 3 is a flow diagram illustrating the operations of an ATM machine 102 of FIG. 1 according to one example embodiment of the invention. In step 302, the patron 110 operates the ATM machine 102 to request a cash withdrawal. In response to receiving the request, the ATM machine 102 (with or without assistance from the banking subsystem 106 for the patron 110, depending on the particular implementation) determines the current surcharge for the current cash withdrawal in step 304 and displays the surcharge to the patron 110 in step 306. In step 308, the patron 110 operates the ATM machine 102 to accept or refuse the cash withdrawal with the determined and displayed surcharge. If the ATM machine 102 determines, in step 310, that the patron 110 refused the cash withdrawal, then processing continues to step 314 to await another cash withdrawal request (or a different ATM transaction). If the ATM machine 102 determines, in step 310, that the patron 110 accepted the cash withdrawal, then, in step 312, the ATM machine 102 completes the cash-withdrawal transaction by dispensing the requested amount of cash to the patron 110 and, for example, transmitting a message to the banking subsystem 106 to debit both the requested amount of cash and the determined surcharge from the patron's bank account. Processing then continues to step 314 to await the next cash-withdrawal transaction from the same or a different patron. If and when that occurs, processing returns to step 304 to handle the new cash-withdrawal request.

The invention has been described in the context of applying surcharges to cash-withdrawal transactions from patron accounts using cash machines such as bank ATM machines and casino kiosks. The invention is not so limited. For example, the invention can be implemented for transaction surcharges for other than cash withdrawals such as (without limitation) check-cashing operations, cash advances, and voucher requests.

The invention can also be implemented for transactions other than those involving the application of surcharges. For example, the invention can be implemented for the sale of any product (where the term "product" covers both tangible goods as well as intangible or tangible services), where the price of the product is adaptively adjusted as a function of previous acceptances and/or refusals of sales of that product. In one implementation, a vending machine that offers a number of different items can dynamically adjust the price of each item as a function of previous acceptances and/or refusals. For example, every time a particular item is sold, the price of that item can increase for the next sale. As time passes without any sales for that item, the price of the item can periodically or intermittently decrease until a sale is made. For example, after a particular type of candy bar is sold, the price of that type is increased by 10 cents, and after every hour in which there is no subsequent sale, the price of that type is decreased by 1 cent, for example, down to some specified minimum price. In addition or instead, when a particular item is sold, the prices of one or more other items in the vending machine can be decreased.

In another implementation, the price of gasoline charged at a gas station can by adaptively generated to vary over time. After each sale, the price of gasoline is increased for the next sale by a specified amount with the price continuing to decrease by a (e.g., smaller) specified amount after every specified time interval in which there is no sale of gasoline.

In another implementation, the prices of items on a menu can vary over time as a result of past offers for sale and whether those offers were accepted or refused. For example, when a current customer orders a hamburger at a customer touchpoint, the system can offer to include grilled onions for a specified extra cost. If the current customer accepts the offer of grilled onions at the specified extra cost, then the system may offer to include grilled onions at a higher extra cost to the next customer who orders a hamburger. If, however, the current customer refuses the offer of grilled onions at the specified extra cost, then the system may offer to include grilled onions at a lower extra cost to the next customer who orders a hamburger. Note that the system may apply a minimum extra cost for the grilled onions no matter how many refusals there are in order to ensure that out-of-pocket costs and other overhead expenses are covered. The system may also apply a maximum extra cost for the grilled onions.

In some embodiments, the invention is a machine-implemented method comprising (a) the machine offering an instance of a product at a first price to each customer in a first set of one or more customers; (b) the machine then receiving an acceptance or a refusal from each customer of the first set; (c) the machine then generating a second price for the product by adjusting the first price based on at least one of the acceptance or the refusal from each customer of the first set, wherein at least one of (i) each customer acceptance corresponds to a price increase and (ii) each customer refusal corresponds to a price decrease; and (d) the machine then offering an instance of the product at the second price to each customer in a second set of one or more customers.

In some of the previous embodiments, steps (b), (c), and (d) are repeated by the machine for the second set of one or more customers to generate a third price for the product to be offered to a third set of one or more customers.

In some of the previous embodiments, the first set has a single customer.

In some of the previous embodiments, step (b) comprises the machine determining a time duration between the offering of step (a) and the receiving of step (b), and the size of at least one of (i) the price increase and (ii) the price decrease is a function of the magnitude of the time duration.

In some of the previous embodiments, at least one of (i) the size of the price increase is greater for a shorter time duration for a customer acceptance than for a longer time duration for a customer acceptance and (ii) the size of the price decrease is greater for a shorter time duration for a customer refusal than for a longer time duration for a customer refusal.

In some of the previous embodiments, step (a) comprises the machine dynamically determining the first set of one or more customers based on timing between customers.

In some of the previous embodiments, the machine closes the first set of one or more customers after a specified amount of time has passed following the most-recent customer in the first set.

In some of the previous embodiments, step (b) comprises (b1) the machine receiving a refusal from a customer of the first set; (b2) the machine offering the customer a modified instance of the product to the customer at the first price; and (b3) the machine receiving an acceptance or a refusal from the customer for the modified instance of the product at the first price.

In some of the previous embodiments, the machine is a cash machine, the product is an amount of cash, the first price is a surcharge, and the modified instance of the product is a larger amount of cash.

In some of the previous embodiments, the size of the price increase is greater than the size of the price decrease.

In some of the previous embodiments, steps (a)-(d) are independently implemented by the machine for two or more different times of day.

In some of the previous embodiments, steps (a)-(d) are independently implemented by the machine for two or more different days of the week.

In some of the previous embodiments, steps (a)-(d) are independently implemented by the machine for two or more different days of the year.

In some of the previous embodiments, the machine is a cash machine, the product is an amount of cash, the first price is a first surcharge, and the second price is a second surcharge different from the first surcharge.

In some of the previous embodiments, the size of the first surcharge is a function of the size of the amount of cash.

In some of the previous embodiments, the size of the first surcharge is larger for a smaller amount of cash than for a larger amount of cash.

In some of the previous embodiments, the cash machine is a casino kiosk.

In some of the previous embodiments, the first price is a function of the identity of a customer.

In some of the previous embodiments, the size of at least one of the price increase and the price decrease is a function of the identity of a customer.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art.

In this specification, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not intended to be limited to being implemented in that particular sequence.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A cash machine-implemented method comprising:
(a) for at least one customer in a first set of one or more sequential customers, the cash machine receiving a request for a cash withdrawal from the customer resulting from the customer operating the cash machine and generating a display offering the requested cash withdrawal at a first surcharge to the customer;
(b) for the at least one customer in the first set, the cash machine receiving and keeping track of an explicit acceptance or an explicit refusal of the requested cash withdrawal from the customer resulting from the customer operating the cash machine and, for an explicit acceptance, the cash machine dispensing cash to the customer for the requested cash withdrawal and enabling charging the first surcharge to the customer by transmitting a message to a banking system identifying the first surcharge;
(c) the cash machine enabling generation of a second surcharge for subsequent cash withdrawals by increasing or decreasing the first surcharge after steps (a) and (b) based on the zero, one, or more explicit acceptances and the zero, one, or more explicit refusals received from the one or more sequential customers of the first set;
(d) for at least one customer in a second set of one or more sequential customers, the cash machine receiving a request for a cash withdrawal from the customer resulting from the customer operating the cash machine and generating a display offering the requested cash withdrawal at the second surcharge to the customer; and
(e) for the at least one customer in the second set, the cash machine receiving and keeping track of an explicit acceptance or an explicit refusal of the requested cash withdrawal from the customer resulting from the customer operating the cash machine and, for an explicit acceptance, the cash machine dispensing cash to the customer for the requested cash withdrawal and enabling charging the second surcharge to the customer by transmitting a message to a banking system identifying the second surcharge, wherein:
the cash machine closes the first set after the cash machine determines that a specified amount of time has passed following the most-recent customer in the first set, such that the cash machine will keep the first set open and the cash machine will continue to charge the first surcharge to each customer as long as the cash machine determines that the time since the most-recent customer in the first set is less than the specified amount of time;
the cash machine determines whether a current customer is same as or different from a previous customer who refused a previous cash withdrawal at the first surcharge;
the cash machine prevents a current cash withdrawal from occurring at the second surcharge lower than the first surcharge if the cash machine determines that the current customer is the same as the previous customer; and the cash machine allows the current cash withdrawal to occur at the second surcharge lower than the first surcharge if the cash machine determines that the current customer is different from the previous customer.

2. The method of claim 1, wherein steps (a), (b), and (c) are repeated by the cash machine for the at least one customer of the second set to enable generation of a third surcharge for cash withdrawals to be offered to at least one customer of a third set.

3. The method of claim 1, wherein the first set has a single customer.

4. The method of claim 1, wherein:
the cash machine determines a time duration between the offering of step (a) and the receiving of step (b) for each customer of the first set;
the size of a surcharge increase generated by the cash machine is greater for shorter time durations for customer explicit acceptances than for longer time durations for customer explicit acceptances; and
the size of a surcharge decrease generated by the cash machine is greater for shorter time durations for customer explicit refusals than for longer time durations for customer explicit refusals.

5. The method of claim 1, wherein step (b) comprises:
(b1) the cash machine receiving a refusal from a customer of the first set;
(b2) the cash machine offering the customer a larger cash withdrawal at the first surcharge;
(b3) the cash machine receiving an acceptance or a refusal from the customer for the larger cash withdrawal at the first surcharge; and
(b4) if the customer accepts the larger cash withdrawal, then the cash machine dispenses cash to the customer for the larger cash withdrawal and enables charging the first surcharge to the customer.

6. The method of claim 1, wherein the size of the surcharge increase is greater than the size of the surcharge decrease.

7. The method of claim 1, wherein steps (a)-(e) are implemented by the cash machine for two or more different times of day such that at least one of (i) the size of the surcharge increase is different for the two or more different times of day and (ii) the size of the surcharge decrease is different for the two or more different times of day.

8. The method of claim 1, wherein steps (a)-(e) are implemented by the cash machine for two or more different days of the week such that at least one of (i) the size of the surcharge increase is different for the two or more different days of the week and (ii) the size of the surcharge decrease is different for the two or more different days of the week.

9. The method of claim 1, wherein steps (a)-(e) are implemented by the cash machine for two or more different days of the year such that at least one of (i) the size of the surcharge increase is different for the two or more different days of the year and (ii) the size of the surcharge decrease is different for the two or more different days of the year.

10. The method of claim 1, wherein the size of the first surcharge is larger for a smaller cash withdrawal than for a larger cash withdrawal.

11. The method of claim 1, wherein the cash machine is a casino kiosk.

12. The method of claim 1, wherein the first surcharge is a function of the identity of a customer.

13. The method of claim 1, wherein the size of at least one of the surcharge increase and the surcharge decrease is a function of the identity of a customer.

14. A cash machine comprising:
(a) means for receiving a request for a cash withdrawal from a customer resulting from the customer operating the cash machine and generating a display offering the requested cash withdrawal at a first surcharge to the customer, for at least one customer in a first set of one or more sequential customers;
(b) means for receiving and keeping track of an explicit acceptance or an explicit refusal of the requested cash withdrawal from the at least one customer of the first set resulting from the at least one customer operating the cash machine and, for an explicit acceptance, for dispensing cash to the customer for the requested cash withdrawal and for enabling charging the first surcharge to the customer by transmitting a message to a banking system identifying the first surcharge;
(c) means for enabling generation of a second surcharge for subsequent cash withdrawals by increasing or decreasing the first surcharge after the processing of means (a) and means (b) based on the zero, one, or more explicit acceptances and the zero, one, or more explicit refusals received from the one or more sequential customers of the first set;
(d) means for receiving a request for a cash withdrawal from a customer resulting from the customer operating the cash machine and generating a display offering the requested cash withdrawal at the second surcharge to the customer, for at least one customer in a second set of one or more sequential customers; and
(e) means for receiving and keeping track of an explicit acceptance or an explicit refusal of the requested cash withdrawal from the at least one customer in the second set resulting from the at least one customer operating the cash machine and, for an explicit acceptance, for dispensing cash to the customer for the requested cash withdrawal and for transmitting a message for charging the second surcharge to the customer by transmitting a message to a banking system identifying the second surcharge, wherein:
the cash machine closes the first set after the cash machine determines that a specified amount of time has passed following the most-recent customer in the first set, such that the cash machine will keep the first set open and the cash machine will continue to charge the first surcharge to each customer as long as the cash machine determines that the time since the most-recent customer in the first set is less than the specified amount of time;
the cash machine determines whether a current customer is same as or different from a previous customer who refused a previous cash withdrawal at the first surcharge;
the cash machine prevents a current cash withdrawal from occurring at the second surcharge lower than the first surcharge if the cash machine determines that the current customer is the same as the previous customer; and
the cash machine allows the current cash withdrawal to occur at the second surcharge lower than the first surcharge if the cash machine determines that the current customer is different from the previous customer.

15. A cash machine comprising a processor, a cash dispenser, and a display, wherein the processor is configured to operate the display and the cash dispenser such that:
(a) for at least one customer in a first set of one or more sequential customers, the cash machine receives a request for a cash withdrawal from the customer resulting from the customer operating the cash machine and generates a display offering the requested cash withdrawal at a first surcharge to the customer;
(b) for the at least one customer in the first set, the cash machine receives and keeps track of an explicit acceptance or an explicit refusal of the requested cash withdrawal from the customer resulting from the customer operating the cash machine and, for an explicit acceptance, the cash machine dispenses cash to the customer for the requested cash withdrawal and enables charging the first surcharge to the customer by transmitting a message to a banking system identifying the first surcharge;
(c) the cash machine enables generation of a second surcharge for subsequent cash withdrawals by increasing or decreasing the first surcharge after the processing of (a) and (b) based on the zero, one, or more explicit acceptances and the zero, one, or more explicit refusals received from the one or more sequential customers of the first set;
(d) for at least one customer in a second set of one or more sequential customers, the cash machine receives a request for a cash withdrawal from the customer resulting from the customer operating the cash machine and generates a display offering the requested cash withdrawal at the second surcharge to the customer; and
(e) for the at least one customer in the second set, the cash machine receives and keeps track of an explicit acceptance or an explicit refusal of the requested cash withdrawal from the customer resulting from the customer operating the cash machine and, for an explicit acceptance, the cash machine dispenses cash to the customer for the requested cash withdrawal and transmits a message for charging the second surcharge to the customer by transmitting a message to a banking system identifying the second surcharge, wherein:
the cash machine closes the first set after the cash machine determines that a specified amount of time has passed following the most-recent customer in the first set, such that the cash machine will keep the first set open and the cash machine will continue to charge the first surcharge to each customer as long as the cash machine determines that the time since the most-recent customer in the first set is less than the specified amount of time;
the cash machine determines whether a current customer is same as or different from a previous customer who refused a previous cash withdrawal at the first surcharge;
the cash machine prevents a current cash withdrawal from occurring at the second surcharge lower than the first surcharge if the cash machine determines that the current customer is the same as the previous customer; and
the cash machine allows the current cash withdrawal to occur at the second surcharge lower than the first surcharge if the cash machine determines that the current customer is different from the previous customer.

16. The cash machine of claim 15, wherein:
the cash machine determines a time duration between the offering of the cash withdrawal and the receiving of the explicit acceptance or the explicit refusal for each customer of the first set;
the size of a surcharge increase generated by the cash machine is greater for shorter time durations for customer explicit acceptances than for longer time durations for customer explicit acceptances; and
the size of a surcharge decrease generated by the cash machine is greater for shorter time durations for customer explicit refusals than for longer time durations for customer explicit refusals.

17. The cash machine of claim 15, wherein the receiving of (b) comprises:
(b1) the cash machine receiving a refusal from a customer of the first set;
(b2) the cash machine offering the customer a larger cash withdrawal at the first surcharge; and
(b3) the cash machine receiving an acceptance or a refusal from the customer for the larger cash withdrawal at the first surcharge; and
(b4) if the customer accepts the larger cash withdrawal, then the cash machine dispensing cash to the customer for the larger cash withdrawal and enables charging the first surcharge to the customer.

18. The cash machine of claim 15, wherein the size of the surcharge increase is greater than the size of the surcharge decrease.

19. The cash machine of claim 15, wherein the cash machine implements (a)-(e) for two or more different times of day such that at least one of (i) the size of the surcharge increase is different for the two or more different times of day and (ii) the size of the surcharge decrease is different for the two or more different times of day.

20. The cash machine of claim 15, wherein the cash machine implements (a)-(e) for two or more different days of the week such that at least one of (i) the size of the surcharge increase is different for the two or more different days of the week and (ii) the size of the surcharge decrease is different for the two or more different days of the week.

21. The cash machine of claim 15, wherein the cash machine implements (a)-(e) for two or more different days of the year such that at least one of (i) the size of the surcharge increase is different for the two or more different days of the year and (ii) the size of the surcharge decrease is different for the two or more different days of the year.

22. The cash machine of claim 15, wherein the cash machine is a casino kiosk.

23. The cash machine of claim 15, wherein the first surcharge is a function of the identity of a customer.

24. The cash machine of claim 15, wherein the size of at least one of the surcharge increase and the surcharge decrease is a function of the identity of a customer.

25. The cash machine of claim 14, wherein:
the cash machine determines a time duration between the offering of the cash withdrawal and the receiving of the explicit acceptance or the explicit refusal for each customer of the first set;
the size of a surcharge increase generated by the cash machine is greater for shorter time durations for customer explicit acceptances than for longer time durations for customer explicit acceptances; and
the size of a surcharge decrease generated by the cash machine is greater for shorter time durations for customer explicit refusals than for longer time durations for customer explicit refusals.

26. A cash machine-implemented method comprising:
(a) for at least one customer in a first set of one or more sequential customers, the cash machine receiving a request for a cash withdrawal from the customer resulting from the customer operating the cash machine and generating a display offering the requested cash withdrawal at a first surcharge to the customer;
(b) for the at least one customer in the first set, the cash machine receiving and keeping track of an explicit acceptance or an explicit refusal of the requested cash withdrawal from the customer resulting from the customer operating the cash machine and, for an explicit acceptance, the cash machine dispensing cash to the customer for the requested cash withdrawal and enabling charging the first surcharge to the customer by transmitting a message to a banking system identifying the first surcharge;
(c) the cash machine enabling generation of a second surcharge for subsequent cash withdrawals by increasing or decreasing the first surcharge after steps (a) and (b) based on the zero, one, or more explicit acceptances and the zero, one, or more explicit refusals received from the one or more sequential customers of the first set;
(d) for at least one customer in a second set of one or more sequential customers, the cash machine receiving a request for a cash withdrawal from the customer resulting from the customer operating the cash machine and generating a display offering the requested cash withdrawal at the second surcharge to the customer; and
(e) for the at least one customer in the second set, the cash machine receiving and keeping track of an explicit acceptance or an explicit refusal of the requested cash withdrawal from the customer resulting from the customer operating the cash machine and, for an explicit acceptance, the cash machine dispensing cash to the customer for the requested cash withdrawal and enabling charging the second surcharge to the customer by transmitting a message to a banking system identifying the second surcharge, wherein:
the cash machine determines a time duration between the offering of step (a) and the receiving of step (b) for each customer of the first set;
the size of a surcharge increase generated by the cash machine is greater for shorter time durations for customer explicit acceptances than for longer time durations for customer explicit acceptances;
the size of a surcharge decrease generated by the cash machine is greater for shorter time durations for customer explicit refusals than for longer time durations for customer explicit refusals;
the cash machine determines whether a current customer is same as or different from a previous customer who refused a previous cash withdrawal at the first surcharge;
the cash machine prevents a current cash withdrawal from occurring at the second surcharge lower than the first surcharge if the cash machine determines that the current customer is the same as the previous customer; and
the cash machine allows the current cash withdrawal to occur at the second surcharge lower than the first surcharge if the cash machine determines that the current customer is different from the previous customer.

27. A cash machine comprising:
(a) means for receiving a request for a cash withdrawal from a customer resulting from the customer operating the cash machine and generating a display offering the requested cash withdrawal at a first surcharge to the customer, for at least one customer in a first set of one or more sequential customers;
(b) means for receiving and keeping track of an explicit acceptance or an explicit refusal of the requested cash withdrawal from the at least one customer of the first set resulting from the at least one customer operating the cash machine and, for an explicit acceptance, for dispensing cash to the customer for the requested cash withdrawal and for enabling charging the first surcharge to the customer by transmitting a message to a banking system identifying the first surcharge;
(c) means for enabling generation of a second surcharge for subsequent cash withdrawals by increasing or decreasing the first surcharge after the processing of means (a) and means (b) based on the zero, one, or more explicit acceptances and the zero, one, or more explicit refusals received from the one or more sequential customers of the first set;
(d) means for receiving a request for a cash withdrawal from a customer resulting from the customer operating the cash machine and generating a display offering the requested cash withdrawal at the second surcharge to the customer, for at least one customer in a second set of one or more sequential customers; and
(e) means for receiving and keeping track of an explicit acceptance or an explicit refusal of the requested cash withdrawal from the at least one customer in the second set resulting from the at least one customer operating the cash machine and, for an explicit acceptance, for dispensing cash to the customer for the requested cash withdrawal and for transmitting a message for charging the second surcharge to the customer by transmitting a message to a banking system identifying the second surcharge, wherein:
the cash machine determines a time duration between the offering of the cash withdrawal and the receiving of the explicit acceptance or the explicit refusal for each customer of the first set;
the size of a surcharge increase generated by the cash machine is greater for shorter time durations for customer explicit acceptances than for longer time durations for customer explicit acceptances;
the size of a surcharge decrease generated by the cash machine is greater for shorter time durations for customer explicit refusals than for longer time durations for customer explicit refusals;
the cash machine determines whether a current customer is same as or different from a previous customer who refused a previous cash withdrawal at the first surcharge;
the cash machine prevents a current cash withdrawal from occurring at the second surcharge lower than the first surcharge if the cash machine determines that the current customer is the same as the previous customer; and
the cash machine allows the current cash withdrawal to occur at the second surcharge lower than the first surcharge if the cash machine determines that the current customer is different from the previous customer.

28. A cash machine comprising a processor, a cash dispenser, and a display, wherein the processor is configured to operate the display and the cash dispenser such that:

(a) for at least one customer in a first set of one or more sequential customers, the cash machine receives a request for a cash withdrawal from the customer resulting from the customer operating the cash machine and generates a display offering the requested cash withdrawal at a first surcharge to the customer;

(b) for the at least one customer in the first set, the cash machine receives and keeps track of an explicit acceptance or an explicit refusal of the requested cash withdrawal from the customer resulting from the customer operating the cash machine and, for an explicit acceptance, the cash machine dispenses cash to the customer for the requested cash withdrawal and enables charging the first surcharge to the customer by transmitting a message to a banking system identifying the first surcharge;

(c) the cash machine enables generation of a second surcharge for subsequent cash withdrawals by increasing or decreasing the first surcharge after the processing of (a) and (b) based on the zero, one, or more explicit acceptances and the zero, one, or more explicit refusals received from the one or more sequential customers of the first set;

(d) for at least one customer in a second set of one or more sequential customers, the cash machine receives a request for a cash withdrawal from the customer resulting from the customer operating the cash machine and generates a display offering the requested cash withdrawal at the second surcharge to the customer; and (e) for the at least one customer in the second set, the cash machine receives and keeps track of an explicit acceptance or an explicit refusal of the requested cash withdrawal from the customer resulting from the customer operating the cash machine and, for an explicit acceptance, the cash machine dispenses cash to the customer for the requested cash withdrawal and transmits a message for charging the second surcharge to the customer by transmitting a message to a banking system identifying the second surcharge, wherein:

the cash machine determines a time duration between the offering of the cash withdrawal and the receiving of the explicit acceptance or the explicit refusal for each customer of the first set;

the size of a surcharge increase generated by the cash machine is greater for shorter time durations for customer explicit acceptances than for longer time durations for customer explicit acceptances;

the size of a surcharge decrease generated by the cash machine is greater for shorter time durations for customer explicit refusals than for longer time durations for customer explicit refusals;

the cash machine determines whether a current customer is same as or different from a previous customer who refused a previous cash withdrawal at the first surcharge;

the cash machine prevents a current cash withdrawal from occurring at the second surcharge lower than the first surcharge if the cash machine determines that the current customer is the same as the previous customer; and the cash machine allows the current cash withdrawal to occur at the second surcharge lower than the first surcharge if the cash machine determines that the current customer is different from the previous customer.

\* \* \* \* \*